US011361027B2

(12) United States Patent
Reehil et al.

(10) Patent No.: US 11,361,027 B2
(45) Date of Patent: Jun. 14, 2022

(54) HISTORICAL STATE MANAGEMENT IN DATABASES

(71) Applicant: AT&T Intellectual Property I, L.P., Atlanta, GA (US)

(72) Inventors: William Reehil, Jackson, NJ (US); Robby Maharajh, South Richmond Hill, NY (US); Soumya Naik, Freehold, NJ (US); Harish Venkata Kajur, Piscataway, NJ (US); Manisha Aggarwal, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 109 days.

(21) Appl. No.: 16/674,194

(22) Filed: Nov. 5, 2019

(65) Prior Publication Data

US 2021/0133245 A1    May 6, 2021

(51) Int. Cl.
| | |
|---|---|
| G06F 16/00 | (2019.01) |
| G06F 16/901 | (2019.01) |
| G06F 16/245 | (2019.01) |
| G06F 16/21 | (2019.01) |
| H04L 43/045 | (2022.01) |

(52) U.S. Cl.
CPC ........ *G06F 16/9024* (2019.01); *G06F 16/219* (2019.01); *G06F 16/245* (2019.01); *H04L 43/045* (2013.01)

(58) Field of Classification Search
CPC .. G06F 16/9024; G06F 16/245; G06F 16/219; G06F 16/9027; H04L 43/045

USPC ......................................................... 707/741
See application file for complete search history.

(56) References Cited

U.S. PATENT DOCUMENTS

| | | | | |
|---|---|---|---|---|
| 9,659,043 | B2 * | 5/2017 | DaCosta | G06F 16/283 |
| 10,824,676 | B2 * | 11/2020 | Ogrinz | G06F 16/219 |
| 2015/0074044 | A1 * | 3/2015 | Metreveli | G06F 16/2343 |
| | | | | 707/609 |
| 2017/0212945 | A1 * | 7/2017 | Shankar | G06F 16/2358 |
| 2017/0262521 | A1 * | 9/2017 | Cho | G06F 16/27 |
| 2017/0262551 | A1 * | 9/2017 | Cho | G06F 16/9535 |
| 2017/0277769 | A1 * | 9/2017 | Pasupathy | G06F 16/9027 |
| 2018/0089331 | A1 * | 3/2018 | Long | G06F 16/2455 |
| 2018/0239796 | A1 * | 8/2018 | Song | G06F 16/282 |
| 2018/0246987 | A1 * | 8/2018 | Das | G06F 16/284 |
| 2018/0349002 | A1 * | 12/2018 | Kindelsberger | G06F 3/0484 |
| 2018/0357329 | A1 * | 12/2018 | Meyer | G06F 16/90335 |
| 2019/0026334 | A1 * | 1/2019 | Ma | G06F 16/9024 |
| 2020/0097615 | A1 * | 3/2020 | Song | G06F 16/215 |
| 2020/0175071 | A1 * | 6/2020 | Ogrinz | G06F 16/28 |
| 2020/0409931 | A1 * | 12/2020 | Zang | G06F 11/1471 |

(Continued)

*Primary Examiner* — Thanh-Ha Dang

(57) ABSTRACT

A processing system including at least one processor may maintain a graph database including graph state information for a set of elements of a graph, where the graph state information includes, for each element in the set of elements of the graph, respective element state information for the respective element. The processing system may further generate, from the graph database, an historical graph database including historical graph state information, where the historical graph state information includes, for each element in the set of elements of the graph, the respective element state information for the respective element and respective state version tracking information for the respective element.

20 Claims, 5 Drawing Sheets

(56) References Cited

U.S. PATENT DOCUMENTS

| | | | |
|---|---|---|---|
| 2021/0011913 A1* | 1/2021 | Chandramouli | G06F 16/23 |
| 2021/0026894 A1* | 1/2021 | Yang | G06F 16/9024 |

* cited by examiner

HISTORICAL STATE MANAGEMENT IN DATABASES

The present disclosure relates generally to databases, and more particularly to methods, computer-readable media, and apparatuses supporting historical state management in graph databases.

BACKGROUND

Graph databases are useful for organizing and managing large amounts of interconnected data. The ability to easily and efficiently retrieve data from graph databases is important as these data structures gain popularity.

SUMMARY

Methods, computer-readable media, and apparatuses for supporting historical state management in graph databases are described. For instance, in one example, a processing system including at least one processor may maintain a graph database including graph state information for a set of elements of a graph, where the graph state information includes, for each element in the set of elements of the graph, respective element state information for the respective element. The processing system may further generate, from the graph database, an historical graph database including historical graph state information, where the historical graph state information includes, for each element in the set of elements of the graph, the respective element state information for the respective element and respective state version tracking information for the respective element.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes methods, computer-readable media, and apparatuses for supporting historical state management in databases. In one example, historical state management may be supported in databases such as graph databases, which may be used to represent and store data of a dataset using a graph-based representation of the dataset that is based on a graph that includes elements which may be used to represent the data of the dataset (e.g., vertices, edges, and properties). In one example, supporting historical state management may include maintaining, by a processing system including at least one processor, a graph database including graph state information for a set of elements of a graph, where the graph state information includes, for each element in the set of elements of the graph, respective element state information for the respective element, and generating, by the processing system from the graph database, an historical graph database including historical graph state information, where the historical graph state information includes, for each element in the set of elements of the graph, the respective element state information for the respective element and respective state version tracking information for the respective element. It will be appreciated that these and other examples of the present disclosure may be useful in various contexts within which graph databases may be used to represent and store data of a dataset, such as within the contexts of managing communication networks, transportation systems, environmental ecosystems, organizational structure information, entity relationship information, social networks, and so forth. Accordingly, it will be appreciated that, although various examples of the present disclosure are primarily directed to use of historical state management in graph databases that represent and store data of a communication network to support communication network management for the communication network, various examples of the present disclosure may be used within various other contexts in which graph databases may be used to represent and store various other types of data which may be used for various other purposes. These and other aspects of the present disclosure are discussed in greater detail below in connection with the examples of FIGS. 1-5.

Figure 1:
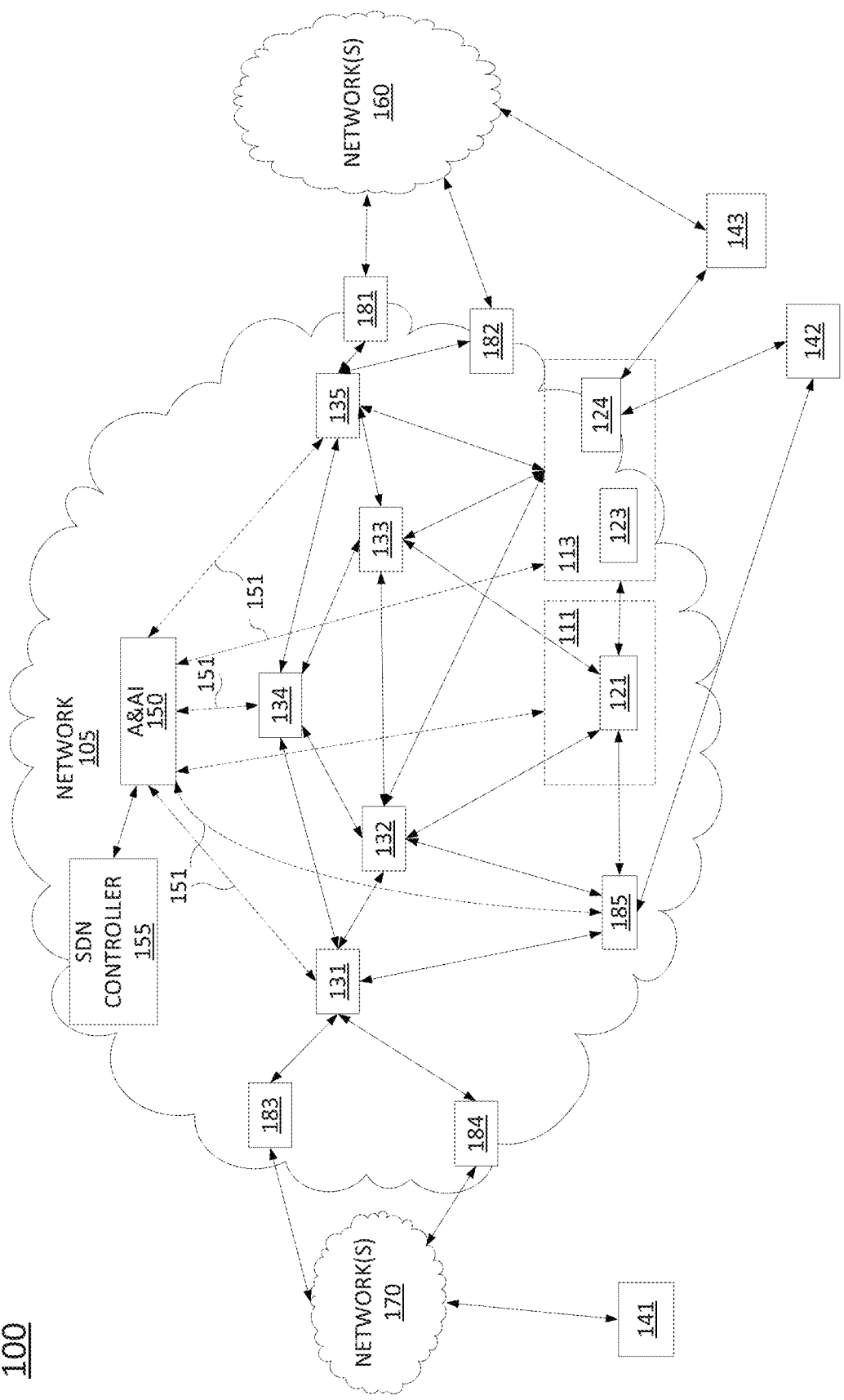
FIG. 1 illustrates an example system related to the present disclosure.

FIG. 1 illustrates a block diagram depicting one example of a communication network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network.

In one example, the network 105 may include a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additionally include components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) including virtual network functions (VNFs). In other words, at least a portion of the network 105 may incorporate software-defined network (SDN) components. In this regard, it should be noted that, as referred to herein, "traffic" may include all or a portion of a transmission, e.g., a sequence or flow, including one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may include separate domains, e.g., separate routing domains from the network 105. In one example, networks 160 and/or networks 170 may represent the Internet in general.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. For instance, the traffic may relate to management actions performed on the network 105 (e.g., management actions such as create/update/delete (CRUD) operations, queries, and so forth). User devices 141-143 may include, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, user devices 141-143 may communicate with or may communicate via network 105 in various ways. For example, user device 141 may include a cellular telephone which may connect to network 105 via network 170, e.g., a cellular access network. For instance, such an example network 170 may include one or more cell sites, e.g., including a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may include a serving gateway (SGW), a mobility management entity (MME), or the like. In one example, user device 142 may include a customer edge (CE) router which may provide access to network 105 for additional user devices (not shown) which may be connected to the CE router. For instance, in such an example, component 185 may include a provider edge (PE) router.

As mentioned above, various components of network 105 may include virtual network functions (VNFs) which may physically include hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may include shared hardware, e.g., one or more host devices including line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may include host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server (MS), a domain name service (DNS) server, a packet data network gateway (PGW), a gateway mobile switching center (GMSC), a short message service center (SMSC), etc.

In one example, network 105 includes a software defined network (SDN) controller 155. In one example, the SDN controller 155 may comprise a computing device or processing system (e.g., a server), such as computing system 500 depicted in FIG. 5, and may be configured to provide one or more operations or functions in connection with examples of the present disclosure for providing historical state management in graph databases.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may include secure tunnels for signaling communications over an underling IP infrastructure of network 105. In other words, the control links may include virtual links multiplexed with transmission traffic and other data traversing network 105 and carried over a shared set of physical links. For ease of illustration the control links are omitted from FIG. 1. In one example, the SDN controller 155 also may include a virtual machine operating on NFVI/host device(s), or may include a dedicated device. For instance, SDN controller 155 may be collocated with one or more VNFs, or may be deployed in a different host device or at a different physical location.

In one example, the functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NFVI 113 is taken offline, and so on.

In one example, SDN controller 155 may represent a processing system including a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

In one example, the network 105 may also include internal nodes 131-135, which may include various components, such as routers, switches, route reflectors, etc., cellular core network, IMS network, and/or VoIP network components, and so forth. In one example, these internal nodes 131-135 may also include VNFs hosted by and operating on additional NFVIs. For instance, as illustrated in FIG. 1, internal nodes 131 and 135 may include VNFs residing on additional NFVI (not shown) that are controlled by SDN controller 155 via additional control links. However, at least a portion of the internal nodes 131-135 may include dedicated devices or components, e.g., non-SDN reconfigurable devices.

In one example, the network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may include a serving gateway (SGW), a mobility management entity (MME), or the like. However, in another example, components 183 and 184 also may include PE routers interfacing with network(s) 170, e.g., for non-cellular network-based communications. In one example, components 181-185 also may include VNFs hosted by and operating on additional NFVI. However, in another example, at least a portion of the components 181-185 may include dedicated devices or components.

In one example, the network 105 includes an active and available inventory (A&AI) system 150. The A&AI system 150 may comprise a computing device or processing system (e.g., a server), such as computing system 500 depicted in FIG. 5, and may be configured to provide one or more operations or functions in connection with examples of the present disclosure for supporting historical state management for graph databases. In one example, the A&AI system 150 may obtain network state information of the network and maintain the network state information of the network. It will be appreciated that the A&AI system 150 may obtain the network state information in various ways and that the A&AI system 150 may maintain the network state information in various ways, as discussed further herein. It will be appreciated that the A&AI system 150 may obtain and maintain the network state information of the network for various purposes (e.g., inventory management, network monitoring, network management, service provisioning, and so forth).

In one example, the network state information of the network may include various types of information associated with the network, such as component configuration information for various components of the network (e.g., nodes, links, paths, functions, and so forth) of the network, network topology information (e.g., information indicative of network connectivity for links and/or paths between components of the network), resource description information for resources of the network, service description information for services supported by the network, and so forth. For example, the network state information may include component configuration information for various physical and virtual components of network 105 and/or networks 160, 170, etc. (e.g., any of internal nodes 131-135, components 181-185, units 121, 123, and 124, NFVI 111 and 113, and the like), network topology information indicative of network connectivity for links and/or paths between components of the network 105 and/or networks 160, 170, etc. (e.g., between any of internal nodes 131-135, components 181-185, units 121, 123, and 124, NFVI 111 and 113, and the like), resource description information for resources of the network 105 and/or networks 160, 170, etc. (e.g., resources available from and/or used to provide any of internal nodes 131-135, components 181-185, units 121, 123, and 124, NFVI 111 and 113, and the like), service description information for services supported by the network 105 and/or networks 160, 170, etc. (e.g., services supported by any of internal nodes 131-135, components 181-185, units 121, 123, and 124, NFVI 111 and 113, and the like), and so forth. It will be appreciated that various other types of information may be included within the network state information of the network that is maintained by the A&AI system 150.

In one example, the network state information of the network may be obtained in various ways. The network state information of the network may be obtained by the A&AI system 150 from various sources of such information (e.g., elements of network 105 and/or networks 160, 170, SDN controller 155, one or more other management systems included within or otherwise associated with network 105 and/or networks 160, 170, and so forth). For example, the devices may send configuration and connectivity information to A&AI system 150, or any one or more of internal nodes 131-135, components 181-185, units 121, 123, and 124, NFVI 111 and 113, and so forth may include aggregation points for collecting configuration and connectivity information and forwarding the configuration and connectivity information to the A&AI system 150. For example, SDN controller 155 may provide configuration information for the network 105 to the A&AI system 150 based on control of the network 105 by the SDN controller 155. The network state information of the network may be obtained in real time or near real time based on an event stream of events indicative of management actions performed on the network (e.g., addition of new nodes, reconfiguration of existing nodes, termination of existing nodes, addition of new links, modification of existing links, termination of existing links, addition of new VNFs, reconfiguration of existing VNFs, termination of existing VNFs, and so forth), where the event stream may be provided from one or more sources (e.g., elements of network 105 and/or networks 160, 170, SDN controller 155, one or more other management systems included within or otherwise associated with network 105 and/or networks 160, 170, and so forth).

In one example, the network state information of the network may be maintained in various ways. The network state information obtained by the A&AI system 150 may be maintained in one or more databases. For example, the network state information obtained by the A&AI system 150 may be maintained in one or more graph databases (e.g., given that the network may be considered to be a graph and, thus, is well-suited for representation in a graph database). In general, a graph database is a database that uses a graph structure to represent and store data of a dataset. The graph database provides a graph-based representation of the dataset. The graph database stores graph information of a graph which provides the graph-based representation of the dataset. The graph-based representation of the dataset may be based on a graph that includes elements which may be used to represent data of the dataset. The elements of the graph for the graph-based representation of the dataset may include vertices, edges, and properties, where the properties may be properties of vertices or properties of edges. For example, the dataset to be represented by the graph database may be data of a communication network (e.g., topology of the communication network), data of a social network (e.g., the members of the social network and associated relationships or potential relationships between the members of the social network), and so forth. For example, where the graph database is used to provide a graph-based representation of a communication network, the devices of the communication network may be represented using vertices of the graph, the communication links or paths of the communication network may be represented using edges of the graph, and various attributes of the devices and communication links or paths of the communication network may be represented using properties of the graph. For example, where the graph database is used to provide a graph-based representation of a social network, the members of the social network may be represented using vertices of the graph, the relationships or potential relationships between the members of the social network may be represented using edges of the graph, and various attributes of the members and relationships or potential relationships of the social network may be represented using properties of the graph. It will be appreciated that the environment for which the dataset is provided may itself be a graph (e.g., the underlying communication networks, social networks, and so forth may be considered to be graphs, which may make the associated datasets particularly well-suited for representation using a graph database) and, thus, that the environment for which the dataset is provided also may be referred to herein as a graph in at least some examples. It will be appreciated that, although primarily presented herein with respect to use of graph databases to represent and store information of a communication network, various examples presented herein may be applied where graph databases are used to represent and store information of various other environments or contexts.

In one example, as indicated above, the A&AI system 150 may support state management for the network by representing and storing the network state information of the network in a graph database for the network. The graph database for the network represents and stores the network state information of the network using a graph, such that the graph may be considered to provide a representation of the network state information of the network and, thus, also a representation of the network. The network state information for the network includes state information for various elements of the network (e.g., communication nodes, communication links and paths, relationships between communication nodes, relationships between communication nodes and communication paths, attributes of communication nodes, attributes of communication links and paths, and so forth), which may be represented and stored within the graph database using elements of the graph database which provide the graph-based representation of the network state information of the network (namely, vertices, edges, and properties of the graph which may be used to represent and store the network state information of the network). The graph database for the network may be updated with network state information of the network in real time or near real time and, thus, the graph database for the network also or alternatively may be referred to as a real-time graph database for the network. The graph database for the network may be updated with network state information of the network in real time or near real time based on processing of events of an event stream, where the events of the event stream may be indicative of management actions performed on the network (e.g., CRUD operations initiated on the network manually by users, automatically by devices, and so forth). It will be appreciated that since the network state information of the network may be represented and stored based on a graph, references herein to storage of network state information for the network in the graph database also may be considered to be references to storage of graph state information (network state information) for the graph (which represents the network state information of the network and, thus, which also may be considered to represent the network).

In one example, the network state information of the network may be maintained within the graph database as graph state information that represents the network state information of the network. In one example, the network state information of the network may be maintained within the graph database as element state information for various elements of the network (e.g., communication nodes, attributes of communication nodes, communication links or paths, attributes of communication links or paths, relationships between communication nodes, relationships between communication nodes and communication links or paths, communication services, attributes of communication services, relationships between communication services and communication nodes, relationships between communication services and communication links or paths, and so forth), and the element state information may be considered to form at least a part of the graph state information of the graph database. The element state information may include, for each of various elements of the network, respective element state information for the respective elements of the network. For example, the element state information may include node state information for various communication nodes of the network (e.g., overall node state information, node attribute state information, and so forth), state information related to network connectivity for communication links or paths between communication nodes of the network, service state information for communication services supported by the network, and so forth. For example, for a communication node, the element state information for the communication node may include an indication of an existence of the communication node (e.g., which may simply be an indication that the communication node exists and that does not necessarily have any specific value assigned thereto), a node name of the communication node, a node identifier of the communication node, an operational status of the communication node, a list of communication links or paths connected to the communication node, a list of services supported by the communication node, and so forth. Similarly, for a communication link, the element state information may include an indication of an existence of the communication link (e.g., which may simply be an indication that the communication link exists that does not necessarily have any specific value assigned thereto), a link identifier of the communication link, an operational status of the communication link, a pair of node identifiers of the communication nodes to which endpoints of the communication link are connected, a list of communication services supported by the communication link, and so forth. Accordingly, it will be appreciated that the element state information for an element may include a label for the element (e.g., NODE-123, which may not have any other value assigned thereto) or may include a value assigned to a label for the element (e.g., IP address: aaa.aaa.aaa.aaa, where "IP address" is a label for the element state information which is actually the value of "aaa.aaa.aaa.aaa"). It will be appreciated that, in the graph-based representation of such network state information in the graph database, the elements that consist of labels may be mapped to vertices of the graph (e.g., a communication node identified as NODE-123 may be a vertex of the graph) or edges of the graph (e.g., a communication link identified as LINK-ABC may be a edge of the graph) and the elements that consist of values associated with labels may be mapped to properties of the graph (e.g., IP address: aaa.aaa.aaa.aaa may be a property associated with a vertex or an edge), although it will be appreciated that other mappings may be used). It is noted that the types of element state information maintained for the elements of the network may vary across element types, network types, and so forth. It will be appreciated that the element state information may be considered to be an element-based representation of the network state information.

In one example, the network state information of the network may be maintained within the graph database based on construction of the graph database in accordance with a schema, e.g., a set of rules regarding the types of vertices in the graph database, the types of edges in the graph database, the types of properties of vertices and edges in the graph database, the manner in which the graph elements of the graph database may be arranged, the manner in which the network state information of the network (in the form of element state information) may be mapped to the graph elements of the graph database, and so forth. The schema may also be defined to imply a hierarchy of nodes of the network. For instance, nodes may be arranged in layers/levels, such as cloud regions, rack tenants, physical servers, and virtual processing resources (e.g., virtual machines (VMs), virtual containers (VCs), and so forth) which may be configured to support various functions (e.g., VNFs), where rack tenants may be child nodes of cloud regions, physical servers may be child nodes of rack tenants, virtual processing resources may be child nodes of physical servers, and so forth. It will be appreciated that the network state information of the network may be maintained within the graph database as graph state information based on construction of the graph database in various other ways (e.g., based on other organizational structures, schemas, rules, and so forth).

In one example, the A&AI system 150 may support historical state management for the network by representing and storing network state information of the network in an historical graph database for the network. The historical graph database for the network represents and stores network state information of the network (e.g., current network state information, previous network state information, and so forth) using a graph, such that the graph may be considered to provide a representation of the network state information of the network and, thus, also a representation of the network. The historical graph database stores historical graph state information for the network that is based on the graph state information of the network that is stored in the graph database for the network. More specifically, the historical graph database, like the graph database, stores element state information for elements of the network while also including corresponding state version tracking information for the element state information for the elements of the network, where such state version tracking information for the element state information for the elements of the network may be used to support historical state management for the network (and, thus, for the associated graph database of the network). The state version tracking information for element state information for the elements of the network may include various types of information which may be used for historical state management functions. For example, the state version tracking information for element state information for an element of the graph may include timestamp information related to the element state information for the element of the network (e.g., start timestamp (start-TS) information which may be indicative of a time of creation or updating of the element, end timestamp (end-TS) information which may be indicative of a time of deletion of the element, and so forth), source of truth (SOT) information related to the element state information for the element of the network (e.g., start-SOT information which may be indicative of the entity (e.g., system, device, person, or the like) which authorized or performed the creation or updating of the element, and end-SOT information which may be indicative of the entity (e.g., system, device, person, or the like) which authorized or performed the deletion of the element), and so forth. Similarly, the state version tracking information for element state information for the elements of the network may include start of lifecycle information for a lifecycle of the element of the network (e.g., information which may be related to creation or updating of the element, such as start-TS, start-SOT, and so forth), end of lifecycle information for a lifecycle of the element of the network (e.g., information which may be related to deletion of the element, such as end-TS, end-SOT, and so forth), and so forth. It will be appreciated that various other types of state version tracking information may be used for tracking the element state information for the elements of the network. It is noted that the state version tracking information also may be referred to herein as temporal metadata (or, more generally, metadata), time series data, and so forth. It will be appreciated, since the network state information of the network may be represented and stored based on a graph, references herein to storage of network state information for the network in the historical graph database also may be considered to be references to storage of historical graph state information (network state information) for the graph (which represents the network state information of the network and, thus, which also may be considered to represent the network).

The A&AI system 150 may provide and maintain the historical graph database in various ways. In one example, the A&AI system 150 may provide and maintain the historical graph database by frontloading the historical graph database with a snapshot of the graph database (e.g., everything known to be true at that time, which is also augmented with state version tracking information such as start-TS and start-SOT information, so as to at least provide a definite point in time from which historical states may be accurately built) and then receiving and processing an event stream including events indicative of changes to the underlying graph in order to reliably maintain the historical graph database. This provides a full historical graph database that can support queries which might otherwise not be able to be supported where the historical graph database is built solely from the event stream including events indicative of changes to the underlying graph and, thus, provides a reliable point from which historical states may be maintained and accessed via queries.

In one example, the A&AI system 150 may provide the historical graph database by generating the historical graph database from the graph database and updating the historical graph database based on processing of an event stream of events indicative of modifications (e.g., CRUD modifications) to the graph (e.g., addition of new nodes, reconfiguration of existing nodes, termination of existing nodes, addition of new links, modification of existing links, termination of existing links, and so forth). It is noted that various aspects related to generating the historical graph database and updating the historical graph database based on processing of an event stream may be further understood from the example of FIG. 2.

In one example, the A&AI system 150 may generate the historical graph database from the graph database by copying the graph database to form a graph database copy and augmenting the graph database copy with state version tracking information to thereby form the historical graph database.

In one example, for each element of the graph for which element state information is copied from the graph database to the historical graph database (e.g., each element of the network state information represented within the graph-based representation of the network state information using graph elements), the state version tracking information that is added to the historical graph database for that element of the graph may include generated state version tracking information that is generated for the element of the graph. In this example, the state version tracking information is fabricated for purposes of providing state version tracking information which may be used to support historical state management via the historical graph database (e.g., until the historical graph database may be further updated with real state version tracking information as such information becomes available). It will be appreciated that the state version tracking information that is added to the historical graph database for elements of the graph may include generated state version tracking information that is generated for the elements of the graph, respectively, where real state version tracking information is unavailable (e.g., from the graph database and/or other potential sources of such information) or is available but cannot be verified with certainty.

In one example, for each element of the graph for which element state information is copied from the graph database to the historical graph database (e.g., each element of the network state information represented within the graph-based representation of the network state information using graph elements), the state version tracking information that is added to the historical graph database for that element of the graph may include any generated state version tracking information which may be generated (e.g., fabricated for purposes of providing state version tracking information which may be used to support historical state management via the historical graph database until the historical graph database may be further updated with real state version tracking information as such information becomes available, such as where real state version tracking information is unavailable or is available but cannot be verified with certainty), any real state version tracking information which may be determined with certainty (e.g., from the graph database and/or any other suitable source of such information), and so forth.

In one example, for each element of the graph for which element state information is copied from the graph database to the historical graph database (e.g., each element of the network state information represented within the graph-based representation of the network state information using graph elements), the state version tracking information that is added to the historical graph database for that element of the graph may include lifecycle start information (e.g., start-TS, start-SOT, and so forth) for the element. For example, the start-TS value that is set for an element may be the current time at which the historical graph database is created (e.g., where the start-TS is fabricated, such as where a true start-TS is not available or is available but cannot be verified with certainty) or any other suitable time (e.g., a true start-TS for an element where such information is available from the graph database or may be determined from the graph database or any other suitable source of such information, such as a management system or other source). For example, the start-SOT value that is set for each of the elements may be an identifier of the graph database from which the historical graph database is created (e.g., where the start-SOT is fabricated, such as where a true start-SOT is not available or is available but cannot be verified with certainty) or an identifier of any other information source which may be considered to be a valid source of truth for that element (e.g., a true start-SOT for an element where such information is available from the graph database or may be determined from the graph database or any other suitable source of such information, such as a management system or other source). It is noted that, since the creation of the historical graph database from the graph database is not expected to result in deletion of any element state information of the graph database, lifecycle end information (e.g., end-TS, end-SOT, and so forth) may not be specified for the elements in the historical graph database during creation of the historical graph database from the graph database; however, it will be appreciated that such lifecycle end information may be added for certain elements of the graph (e.g., ones previously deleted from the graph and marked as deleted in the graph database) where such lifecycle end information may be verified for inclusion within the historical graph database. The generation of the historical graph database may be further understood from the example of FIG. 2.

In one example, as discussed above, the A&AI system 150 may update the historical graph database based on changes to the network (and, thus, changes to the graph of the graph database that is being used to represent and store the network state information of the network and, thus, the network). In one example, as discussed above, the A&AI system 150 may update the historical graph database based on processing of events of an event stream indicative of various management actions (e.g., modifications, such as CRUD operations) performed on the network (e.g., addition of new nodes, configuration of existing nodes, termination of existing nodes, addition of new links, configuration of existing links, termination of existing links, addition of new attributes, configuration of existing attributes, termination of existing attributes, addition of new relationships, configuration of existing relationships, termination of existing relationships, and so forth). The event stream of events indicative of modifications to the network may be a copy of the event stream of events provided to the network for modifying the network. The event stream of events indicative of modifications to the network may be a copy of the event stream of events provided to the graph database for the network based on the modifications to the network. In one example, for a received event associated with an element of the historical graph database (e.g., a management action performed for an element of the network represented by an element of the historical graph database and, thus, associated with the element of the historical graph database), the updating of the historical graph database based on the event may include storing the element state information of the element (e.g., the element state information for the management action performed for the network) as well as the state version tracking information of the element (e.g., lifecycle start information, lifecycle end information, and so forth, where, as discussed further herein, the type of state version tracking information that is stored may depend on the type of management action performed for the element of the network). The updating of the historical graph database based on processing of an event stream may be further understood from the example of FIG. 2.

For example, where the event is a create action for creating a new element in the network (and, thus, graph), the updating of the historical graph database may include creating a new element in the historical graph database representing the new element in the graph and setting state version tracking information for that element in the historical graph database. In one example, the creation of the new element in the historical graph database may include creating the new element and storing element state information for the new element (e.g., node identifier and operational status information for a new node, link endpoint and operational status information for a new link, attribute values for new attributes, and so forth), where it will be appreciated that the element state information for the new element may depend on the element type of the new element (e.g., node, link, attribute, relationship, or the like). In one example, the setting of the state version tracking information may include setting a start-TS indicative of a start time for the create action (e.g., the time at which the create action was approved, sent, effected in the graph, or the like) and a start-SOT indicative of an entity that authorized or performed the create action (e.g., the SDN controller 155, another network device or management system, a network technician, etc.).

For example, where the event is an update action for updating an existing element in the network (and, thus, graph), the updating of the historical graph database may include updating the element in the historical graph database representing the existing element in the graph and updating state version tracking information for that element in the historical graph database. In one example, the updating of the existing element in the historical graph database may include updating the element state information for the existing element (e.g., changing an operational status of a node or link, changing an IP address of a node, changing path connectivity information of a path, adding new configuration information associated with the existing element, removing existing configuration information associated with the existing element, or the like), where it will be appreciated that the element state information for the existing element may depend on the element type of the existing element (e.g., node, link, attribute, relationship, or the like). In one example, the updating of the state version tracking information may include modifying the start-TS of the existing element (e.g., to a time indicative of a start time for the update action (e.g., the time at which update action was approved, sent, effected in the graph, or the like)) and the start-SOT of the existing element (e.g., indicative of an entity that authorized or performed the update action (e.g., the SDN controller 155, another network device or management system, a network technician, etc.)).

For example, where the event is a delete action for deleting an existing element from the network (and, thus, graph), the updating of the historical graph database may include updating state version tracking information for that element in the historical graph database. In one example, the updating of the state version tracking information may include setting the end-TS of the existing element (e.g., to a time indicative of a time for the delete action (e.g., the time at which the delete action was approved, sent, effected in the graph, or the like), which may be indicative of the end of the lifecycle of the element) and the end-SOT of the existing element (e.g., indicative of an entity that authorized or performed the delete action (e.g., the SDN controller 155, another network device or management system, a network technician, etc.)). It will be appreciated that the delete action may or may not trigger updating of the element state information for the element in the historical graph database, i.e., the element state information for the existing element may not be updated (e.g., since the element is being deleted from the graph and, thus, from the historical graph database) or may be updated (e.g., to provide a record of the reason for the deletion or to preserve information indicative of any changes made to the element state information of the element of the graph).

It will be appreciated that, during processing of an event of the event stream, if certain state version tracking information is unavailable or cannot be reliably determined from the event or based on the event, state version tracking information may be fabricated for purposes of providing state version tracking information for the element associated with the event (e.g., the start-TS or end-TS may be set to a time associated with processing of the event, the start-SOT or end-SOT may be set to indicate the A&AI system 150, or another suitable default value, as the SOT associated with processing of the event). In one example, the A&AI system 150, in addition to constructing and maintaining such an historical graph database, may also support handling of client queries on the historical graph database. The handling of client queries may include receiving client queries requesting information, obtaining the requested information, and providing query responses including the requested information. In one example, clients from which client queries may be initiated may include user devices, such as smartphones, personal computers, cloud-based user desktop applications, and so forth. For example, a user, such as a network operations technician, may initiate a query via user device 141. In one example, clients from which client queries may be initiated may include network devices (e.g., physical devices or services/applications running on physical devices), such as a network provisioning system, a network management system, a network security system, a billing system, and so forth. For example, an automated component of network 105, such as SDN controller 155, may initiate a query. It will be appreciated that the clients, upon receiving the requested information provided in the query responses, may handle the received information in various ways (e.g., storing, presenting, processing, and so forth).

In one example, the A&AI system 150 may perform an historical state information control process. The historical state information control process may be configured to control various aspects of maintaining historical state information in the historical graph database (e.g., the manner in which the historical graph state information is retained for use in responding to queries, the amount of historical graph state information that is retained for use in responding to queries, and so forth). The historical state information control process may be configured to support a truncating process for truncating certain portions of the historical graph state information in the historical graph database (e.g., truncation of a portion of the historical graph state information maintained in the historical graph database to limit the amount of state information that is maintained in the historical graph database), an archiving process for creating archival partitions of the historical state information in the historical graph database (e.g., for storing subsets of the historical graph state information in the historical graph database which may be used to support more efficient queries), and so forth.

In one example, as indicated above, the A&AI system 150 may be configured to support control of historical graph state information by using a truncating process for truncating certain portions of the historical graph state information in the historical graph database. It will be appreciated that each running of the truncating process may be considered to be the ending of a current epoch of the historical graph database and the start of a new epoch of the historical graph database. It will be appreciated that the truncating process may be particularly well-suited for use in situations in which storage space requirements outweigh the need for long term history.

In one example, the truncating process for truncating certain portions of the historical graph state information in the historical graph database may include removing each element of the historical graph database having an end-TS that is prior to a truncation time specified for use in performing truncation of the historical graph database, each portion of an element (e.g., a portion of the element state information of the element) having an end-TS that is prior to a truncation time specified for use in performing truncation of the historical graph database (e.g., where multiple values and associated state version tracking information may be maintained for an element to track changes to the value of the element), and so forth. The truncation time may be based on the amount of historical graph state information that it may be necessary or desirable to maintain for various purposes (e.g., troubleshooting and so forth). For example, the truncation time may be one hour prior to the current time, one week prior to the current time, one month prior to the current time, six months prior to the current time, one year prior to the current time, and so forth. It will be appreciated that the truncation time may be set in a manner for balancing the amount of information that needs to be stored (e.g., if there are storage constraints, such as storage constraints based on the cost of storage, based on how much the graph changes over time, and so forth) and a length of time for which the historical graph state information may be needed (e.g., how far back in time it may be necessary or desirable to look at historical graph state information for various management purposes).

In one example, the truncating process for truncating certain portions of the historical graph state information in the historical graph database may include truncating all old state information prior to the newly defined epoch (e.g., removing each element of the historical graph database having an end-TS that is prior to a truncation time specified for delineating the previous epoch from the newly defined epoch) and updating the remaining state information to reflect the start of the newly defined epoch (e.g., for each element having a start-TS prior to the truncation time, updating the start-TS of the element to reflect the newly defined epoch, such as by updating the start-TS of each such element to the truncation time or other time suitable for use as a start time for the newly defined epoch). It will be appreciated that this also may be performed for portions of elements (e.g., truncating a portion of the element state information of the element where that portion of the element state information of the element has an end-TS that is prior to a truncation time specified for use in performing truncation of the historical graph database and updating the start-TS of that portion of the element state information of the element to reflect the newly defined epoch). It will be appreciated that this will give the system a view of the data at the newly defined epoch, such that queries may be performed on the historical graph database within the newly defined epoch.

It will be appreciated that the truncating process may be initiated manually (e.g., by a user of a management system, device, or the like) and/or automatically (e.g., by a management system, device, or the like) based on one or more of a schedule or detection of one or more conditions (e.g., an amount of available storage available for storing the historical graph database being below a threshold, a request for a query on the historical graph database, and so forth) that may result in initiation of the truncating process.

It will be appreciated that, where the truncating process is used, queries requesting historical graph state information may be handled using the historical graph database, just as they would if the truncating process was not used.

In one example, as indicated above, the A&AI system 150 may be configured to control historical graph state information by using an archiving process for creating archival partitions of the historical graph state information in the historical graph database. It will be appreciated that the archiving process may be particularly well-suited for use in situations in which long term history requirements outweigh the need for lower storage space.

In one example, the archiving process for creating archival partitions of the historical graph state information in the historical graph database may include generating, from the historical graph database at one or more archival times, one or more respective archival partitions including one or more respective sets of time-specific historical graph state information for the graph and storing the one or more archival partitions. It will be appreciated that the archival partitions may be considered to be partitioned historical graph databases (and, thus, partitioned graph databases of the underlying graph), representing partitioned versions of the underlying graph (and, thus, historical views of the underlying graph), which may be queried for state information.

In one example, an archival partition may be a snapshot of the historical graph database at a particular time (e.g., the archival time at which creation of the archival partition is performed, an earlier time, and so forth). The archival time may be specified as part of a request for creation of the archival partition, may be determined based on a request for creation of the archival partition, and so forth.

In one example, an archival partition may include historical graph state information maintained in the historical graph database during a period of time. The period of time for an archival partition may be specified as a range of time (e.g., between the time at which creation of the archival partition is performed and an earlier time, between start and end times specified for the archival partition, and so forth). The period of time for an archival partition may be determined based on a reference time (e.g., the time at which creation of the archival partition is performed, an earlier time, and so forth) and a length of time to be used for the archival partition (which may be specified as part of a request for creation of the archival partition, may be predefined or otherwise specified as a length of time for this particular archival partition or for archival partitions in general, and so forth). The period of time for an archival partition time may be specified as part of a request for creation of the archival partition, may be determined based on a request for creation of the archival partition, and so forth.

It will be appreciated that partitioning of the historical graph database into archival partitions based on times or ranges of time may help with management of storage space, performance of queries for state information associated with the graph (e.g., since each archival partition is expected to include a subset of the full historical information of the graph), and so forth.

In one example, the number of archival partitions maintained at any given time may be controlled. For example, the number of archival partitions maintained at any given time may be limited to three archival partitions, five archival partitions, ten archival partitions, one hundred archival partitions, or any other suitable number of archival partitions. In one example, when creation of a new archival partition would result in a number of archival partitions exceeding a maximum number of permitted archival partitions, an oldest existing archival partition may be deleted prior to creation of the new archival partition. The number of archival partitions maintained may be determined based on the sizes of the archival partitions, storage and/or memory considerations associated with storage of the archival partitions (e.g., memory available, cost of maintaining archival partitions, and so forth), or other factors. It will be appreciated that the number of archival partitions maintained may be determined and controlled in various other ways.

In one example in which the archiving process is used for generating a set of archival partitions for the historical graph database, handling of a query requesting information from the historical graph database may be based on the set of archival partitions for the historical graph database rather than based on the historical graph database itself. In one example, handling of a query requesting information from the historical graph database based on the set of archival partitions for the historical graph database may include obtaining a query request that requests a set of information for a particular time, obtaining, based on the query and the set of archival partitions, the set of information for the particular time, and providing a query response including the set of information for the particular time. In one example, obtaining the set of information for the particular time, responsive to the query request and for inclusion in the query response, may include determining from the query request the particular time for which the set of information is requested, identifying, based on the particular time for which the set of information is requested, one or more of the archival partitions including the set of information for the particular time, and obtaining, from the one or more of the archival partitions based on application of the query request to the one or more of the archival partitions, the set of information for the particular time. It will be appreciated that use of a set of archival partitions of a historical graph database to handle a query may be further understood from the example of FIG. 3.

It is noted that since each of the archival partitions stores historical graph state information for a period of time rather than for the life of the historical graph database, it is expected that each of the archival partitions generated from the historical graph database will store less information than is maintained in the historical state database and, thus, that handling of queries using the set of available archival partitions (e.g., finding one of the archival partitions with which the query is associated and then answering the query based on that one of the archival partitions rather than based on the entire historical state database) will be more efficient (e.g., answered in less time) than if the queries were handled using a monolithic historical graph database.

It will be appreciated that the archiving process may be initiated manually (e.g., by a user of a management system, a device, or the like) and/or automatically (e.g., by a management system, device, or the like) based on one or more of a schedule or detection of one or more conditions (e.g., a number of queries being above a threshold, a request for a query on the historical graph database, and so forth) that may result in initiation of the archiving process.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. In still another example, SDN controller 155, A&AI system 150, and/or other network elements may include functions that are spread across several devices that operate collectively as a SDN controller, an A&AI system, an edge device, etc. Thus, these and other modifications of the system 100 are all contemplated within the scope of the present disclosure.

It will be appreciated that while various examples are described herein in connection with an A&AI system that supports a graph database storing graph information of a graph that provides a graph-based representation of a particular dataset for a particular type of system (namely, topology data of a telecommunication network), various principles set forth herein may be applied to various types of systems supporting graph databases storing graph information of graphs that provide graph-based representations of various other datasets for various other types of systems, such as a transportation system, an environmental ecosystem, a graph database representing organizational structure information, a graph database representing entity relationship information, a graph database representing social networking interconnection information, and so forth.

Figure 2:
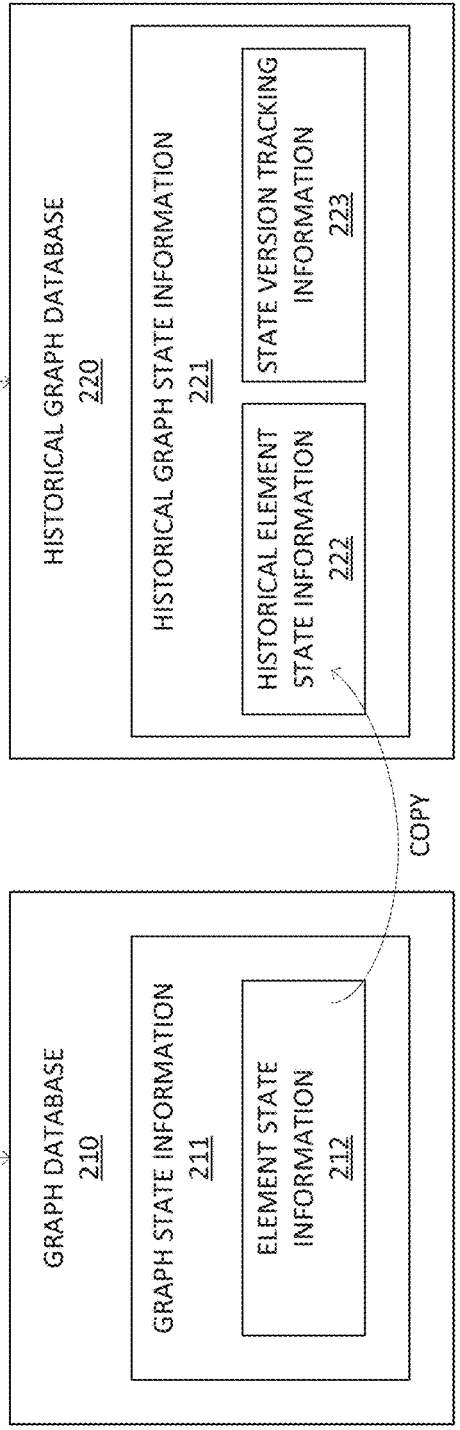
FIG. 2 illustrates an example process of generating an historical graph database for a dataset and updating the historical graph database based on an event stream associated with the dataset.

FIG. 2 illustrates an example process 200 of generating an historical graph database for a graph and updating the historical graph database based on an event stream associated with the graph.

In the example process 200, a graph database 210 stores graph state information 211 for a graph including a set of elements (e.g., components of a network, such as nodes, links, attributes, relationships, and so forth, where the graph is a network). The graph state information 211 includes element state information 212 for the elements of the graph. The element state information 212 includes, for each of the elements of the graph, respective element state information for the respective element of the graph.

It is noted that an example of graph state information 211, including element state information 212 for elements of a network, is illustrated in FIG. 2. For example, as illustrated in FIG. 2, the element state information 212 relates to three high level elements (NODE-123, LINK-XYZ, and LINK-ABC) as well as additional elements related to two of the high-level elements (e.g., elements such as node name, IP address, operational status and attributes for the NODE-123 element and elements such as endpoints, operational status, and attributes for the LINK-XYZ element). It will be appreciated that the element state information 212 for a network may include various other types of information for the network elements, that the element state information 212 may include various other types of information for other types of graphs, and so forth. It will be appreciated that the formatting of the examples of the graph state information 211 in FIG. 2 is merely one type of formatting that may be used and that the graph state information 211 may be formatted in various other ways.

In the example process 200, an historical graph database 220 is generated from the graph database 210. The historical graph database 220 may be generated from the graph database 210 by copying the graph database 210 (e.g., copying the element state information 212 from the graph database 210 and storing it in the historical graph database 220 as historical element state information 222) and augmenting the historical element state information 222 with associated state version tracking information 223 to provide thereby historical graph state information 221 that provides an historical representation of the graph state information 211 of the graph database 210. The historical element state information 222 includes, for each of the elements of the graph, respective element state information for the respective element of the graph. The state version tracking information 223 includes, for each of the elements of the graph, respective state version tracking information for the respective element of the graph. The historical graph state information 221 includes, for each of the elements of the graph, the respective element state information 222 for the respective element (copied from the respective element state information 212 in the graph state information 211 of the graph database 210) and the respective state version tracking information 223 for the respective element (added to the respective element state information copied from the element state information 212 of the graph database 210). As discussed herein, the state version tracking information 223 that is associated with the historical element state information 222 to form the historical graph state information 221 may include TS information (e.g., start-TS, end-TS, and so forth), SOT information (e.g., start-SOT, end-SOT, and so forth), and the like.

It is noted that an example of historical graph state information 221, including historical element state information 222 and state version tracking information 223 for elements of a network, is illustrated in FIG. 2. The historical element state information 222 is identical to the element state information 212 of the graph database 210 (e.g., the NODE-123 element and associated elements, the LINK-XYZ element and associated elements, and so forth), since the element state information 212 of the graph database 210 was copied to provide the historical element state information 222 for the historical graph database 220. The historical element state information 222 has been augmented with state version tracking information 223 that includes, for element of the historical element state information 222, TS information and SOT information for the respective element. In this example, it is assumed that, at the time of copying the element state information 212 to provide the historical element state information 222, actual state version tracking information could be reliably determined for the NODE-123 element and each of its associated elements (e.g., start-TS and start-SOT) as well as for the LINK-ABC element (e.g., end-TS and end-SOT), but that actual state version tracking information could not be determined for the LINK-XYZ element and each of its associated elements and, thus, that generated state version tracking information was fabricated for the LINK-XYZ element and each of its associated elements so as to provide the state version tracking information for the LINK-XYZ element and each of its associated elements. The actual state version tracking information and generated state version tracking information for the example of FIG. 2 are discussed further below.

For example, as illustrated in FIG. 2, the state version tracking information for the NODE-123 element and each of its associated elements includes actual state version tracking information. The NODE-123 element includes a START-TS of 08302019-14:30:15 and a START-SOT of "MS1", which indicates that the creation of the NODE-123 element in the graph took place on Aug. 30, 2019 at the indicated time and that the create operation was performed by a management system identified as MS1. The state version tracking information for the NODE NAME element is identical to the state version tracking information for the NODE-123 element, indicating that the NODE NAME element also was created at the time that the NODE-123 element was created. However, the state version tracking information for the OPERATIONAL STATUS element indicates a later date and time for this element, which may indicate that the OPERATIONAL STATUS element was updated from DOWN to UP after NODE-123 element was created (e.g., if the node was down and came back up). Similarly, the state version tracking information for the ATTRIBUTE 1 and ATTRIBUTE 2 elements indicates a later date and time for these elements, which may indicate that these elements were created, reconfigured, or updated at some time after the NODE-123 element was created (e.g., during a configuration or reconfiguration of NODE-123, responsive to a condition or action, and so forth).

For example, as illustrated in FIG. 2, the state version tracking information for the LINK-XYZ element and each of its associated elements includes generated state version tracking information (e.g., fabricated since actual state version tracking information for these elements could not be determined at the time at which the element state information 212 of the graph database 210 was copied to initially provide the historical element state information 222 for the historical graph database 220). The LINK-XYZ element includes a START-TS of 08152019-11:30:11 (which represents the time at which the element state information 212 of the graph database 210 was copied to initially provide the historical element state information 222 for the historical graph database 220) and a START-SOT of "AAI" (which identifies the system, e.g., A&AI system 150, that copied the element state information 212 of the graph database 210 to initially provide the historical element state information 222 for the historical graph database 220). Similarly, each of the elements associated with the LINK-XYZ element also includes a START-TS of 08152019-11:30:11 and a START-SOT of "AAI" since actual state version tracking information also could not be determined for these elements at the time at which the element state information 212 of the graph database 210 was copied to initially provide the historical element state information 222 for the historical graph database 220.

For example, as illustrated in FIG. 2, the state version tracking information for the LINK-ABC element includes actual state version tracking information. The LINK-ABC element includes a START-TS of 04132019-08:15:00 and a START-SOT of "MS1", which indicates that the creation of the LINK-ABC element in the graph took place on Apr. 13, 2019 at the indicated time and that the create operation was performed by a management system identified as MS1. The LINK-ABC element also includes an END-TS of 07282019-09:13:46 and an END-SOT of "MS1", which indicates that the deletion of the LINK-ABC element from the graph took place on Jul. 28, 2019 at the indicated time and that the delete operation was performed by the management system identified as MS1.

It will be appreciated that the formatting of the examples of the historical graph state information 221 in FIG. 2 is merely one type of formatting that may be used and that the historical graph state information 221 may be formatted in various other ways.

In the example process 200, the graph (network) changes over time (e.g., based on CRUD operations on the network, such as addition of new elements, modification of existing elements, deletion of existing elements, and so forth). The changes to the network over time are represented by the event stream 230 depicted in FIG. 2. The event stream 230 may identify and describe the changes to the network over time (e.g., each event of the event stream 230 may identify and describe one or more CRUD operations made to the network and, thus, to the graph that represents the network state information of the network and, thus, the network). The events of the event stream 230 may be the changes provided to the network (e.g., the actual operations provided to the network to modify the network are captured and provided as the event stream 230) or may be generated based on the changes provided to the network (e.g., representations or descriptions of the actual operations provided to the network to modify the network are generated and provided as the event stream 230).

The changes to the network as represented by the event stream 230 are reflected in the graph database 210 (indicated in FIG. 2 by a flow of the event stream 230 to the graph database 210) so that the graph database 210 continues to maintain an accurate representation of the network over time (e.g., the element state information 212 for the graph that is maintained in the graph database 210 and, thus, the graph state information 211 for the graph that is maintained in the graph database 210, is updated over time based on the changes to the network over time). The events of the event stream 230 are processed to provide updated element state information 212 and, thus, updated graph state information 211 based on the changes to the network as indicated by the event stream 230.

Similarly, the changes to the network as represented by the event stream 230 are reflected in the historical graph database 220 (indicated in FIG. 2 by a flow of the event stream 230 to the historical graph database 210) so that the historical graph database 220 continues to maintain an accurate representation of the graph database 210 (and, thus, the network represented by the graph of the graph database 210) over time. The events of the event stream 230 are processed to provide updated historical element state information 222 and updated state version tracking information 223 and, thus, updated historical graph state information 221 based on the changes to the network as indicated by the event stream 230.

It will be appreciated, at least from the various examples provided in conjunction with FIG. 2, that generation of the historical graph database 220 from the graph database 210 may be performed such that the current state of the elements of the network is asserted into the historical graph database 220, thereby ensuring that the historical graph database 220 is configured such that, for each of the elements of the network (and, thus, also of the element of the graph representing the element of the network), the historical graph database 220 asserts that the state of the respective element was its current state at the indicated time (e.g., a combination of start-TS and start-SOT for an existing element of the network at the time that the historical graph database 220 is created or a combination of end-TS and end-SOT for a previous element of the network that has been deleted from the network). This provides relevant state version tracking information 223 for the historical element state information 222 that may be used for various purposes, including supporting various historical state information control processes (e.g., a truncating process, an archiving process, and so forth) as discussed herein.

It will be appreciated that, although primarily presented herein with respect to examples in which, for each element, the historical graph state information includes a single set of state information for the element (e.g., one set of historical element state information and associated state version tracking information for the element, corresponding to the current element state information and associated state version tracking information for the element), the historical graph state information may include, for one or more of the elements, multiple sets of state information for the given element (e.g., multiple sets of historical element state information and associated state version tracking information for the element), respectively. This may be useful for tracking changes to the historical element state information of the element over time, which may be particularly useful for elements for which the associated historical element state information of the element is expected to change relatively frequently. For example, where the element corresponds to a property of a device in a communication network, such as an IP address of the device, each of the IP addresses assigned to the device in the communication network, as well as details related to the changes to the IP address over time (e.g., timestamp and source of truth information), may be tracked over time using multiple sets of state information for the element corresponding to the IP address of the device.

For example, as illustrated in FIG. 2, where the IP address is set to aaa.aaa.aaa.aaa by a first management system (MS1) on Sep. 14, 2019 at 11:03:31 AM and is then changed to bbb.bbb.bbb.bbb by a second management system (MS2) on Sep. 21, 2019 at 09:37:14 AM, the historical element state information that is maintained for the element corresponding to the IP address of the device (namely, IP ADDRESS) may be set as "IP ADDRESS: bbb.bbb.bbb.bbb START-TS=09212019-09:37:14, START-SOT=MS2; aaa.aaa.aaa.aaa START-TS=09142019-11:03:31, START-SOT=MS1, END-TS=09212019-09:37:14, END-SOT=MS2. In this example, it may be seen that the end of lifecycle information (i.e., end-TS and end-SOT) for the first IP address of the device is the same as the start of lifecycle information (e.g., start-TS and start-SOT) for the second IP address of the device since the updating of the IP address from aaa.aaa.aaa.aaa to bbb.bbb.bbb.bbb was the end of the lifecycle of the aaa.aaa.aaa.aaa IP address and the start of the lifecycle of the bbb.bbb.bbb.bbb IP address. It will be appreciated that the retention of the earlier value of the IP address, and the associated state version tracking information (e.g., TS and SOT) for the earlier value of the IP address, will preserve that information for use in answering queries related to the period of time in which the IP address of the device was set to the aaa.aaa.aaa.aaa IP address. It will be appreciated that the multiple sets of state information for a given element may be maintained as part of the historical graph state information in various ways (e.g., as a string of data, using structuring of data such that each set of state information is maintained as a sub-element of the element to which it applies, and so forth).

It will be appreciated that, where multiple sets of state information are available for one or more elements, the multiple sets of state information may be controlled using an historical state information control process (e.g., using the truncating process, using the archiving process, and so forth). For example, where two sets of state information are available for an element and a first one of the sets of state information includes state version tracking information with an end-TS prior to the truncation time and a second one of the sets of state information includes state version tracking information that does not include an end-TS since the value for the element is still active (i.e., only start of lifecycle information is available) the truncating process may truncate only the first one of the sets of state information of the element while retaining the second one of the sets of state information of the element.

For example, where two sets of state information are available for an element and a first one of the sets of state information includes state version tracking information with timestamp information identifying times within an archival time period for which an archival partition is being created and a second one of the sets of state information includes state version tracking information with timestamp information identifying times outside the archival time period for which the archival partition is being created, the archival process may include only the first one of the sets of state information of the element within the archival partition while excluding the second one of the sets of state information of the element from the archival partition.

It will be appreciated that, where multiple sets of state information are available for one or more elements, the multiple sets of state information may be used to handle queries on the historical graph database.

Figure 3:
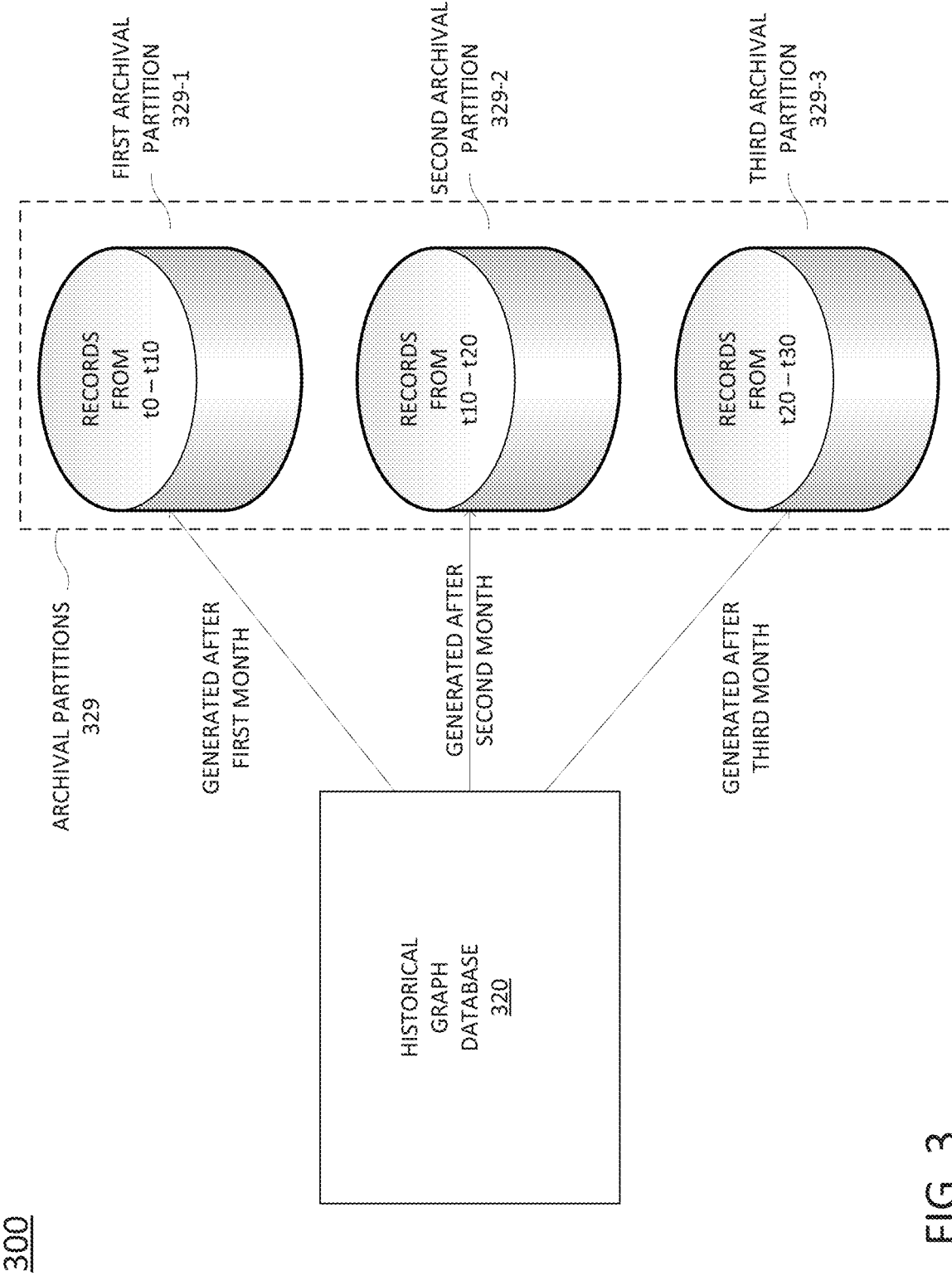
FIG. 3 illustrates an example process of using an archiving process for an historical graph database to provide a set of archival partitions for the historical graph database which may be used to handle queries.

FIG. 3 illustrates an example process 300 of using an archiving process for an historical graph database to provide a set of archival partitions for the historical graph database which may be used to handle queries.

In the example process 300, an historical graph database 320 is periodically processed to form a set of archival partitions 329. The set of archival partitions 329 includes three archival partitions which have been generated from the historical graph database 320 on a monthly basis. More specifically, as illustrated in FIG. 3, a first archival partition 329-1 was generated from the historical graph database 320 after a first month and includes records from times $t_0$-$t_{10}$ (e.g., created at time do and including historical graph state information of the historical graph database 320 for that time period), a second archival partition 329-2 was generated from the historical graph database 320 after a second month and includes records from times $t_{10}$-$t_{20}$ (e.g., created at time $t_{20}$ and including historical graph state information of the historical graph database 320 for that time period), and a third archival partition 329-3 was generated from the historical graph database 320 after a third month and includes records from times $t_{20}$-$t_{30}$ (e.g., created at time $t_{30}$ and including historical graph state information of the historical graph database 320 for that time period). It will be appreciated that, while the example 300 is indicated as including a specific number of partitions (illustratively, three archival partitions 329), fewer or more partitions may be maintained at any given time.

In the example process 300, the archival partitions 329 created from the historical graph database 320, rather than the historical graph database 320 itself, may then be used to handle queries related to the state of the graph. For example, if a user sends a query requesting element state information for an element (e.g. the state of a generic virtualized network function or other element of the graph) at time $t_{12}$, the time $t_{12}$ specified in the query will be used to identify one of the archival partitions 329 relevant to the query (illustratively, based on time $t_{12}$, the second archival partition 329-2) and the query will then be processed using the one of the archival partitions 329 relevant to the query (again, the second archival partition 329-2) rather than using the historical graph database 320 itself. If, for example, the historical graph database 320 maintains about 20 million records, but each partition of the set of archival partitions 329 maintains only about 10 million records, it is expected that each query will be able to be answered in less time, on average, using the set of archival partitions 329 rather than using the historical graph database 320.

Figure 4:
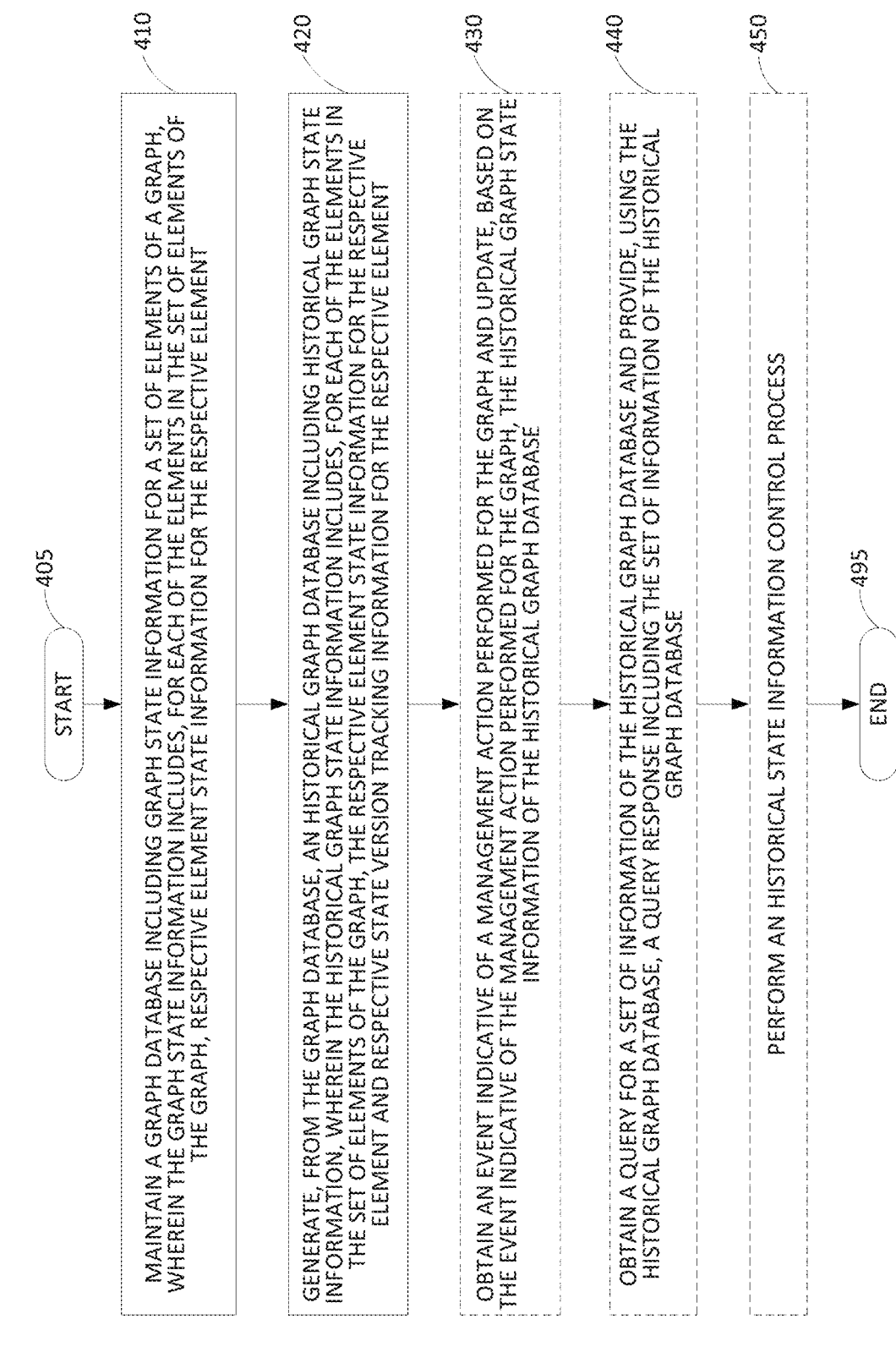
FIG. 4 illustrates a flowchart of an example method for supporting historical state management for a graph database.

FIG. 4 illustrates a flowchart of an example method 400 for supporting historical state information management for a graph database, in accordance with the present disclosure. In one example, the method 400 is performed by a graph database system (e.g., the A&AI system 150 of FIG. 1), or by one or more components thereof (e.g., a processor, or processors, performing operations stored in and loaded from a memory), or by a graph database system in conjunction with one or more other components, such as A&AI system 150 in conjunction with a client device (e.g., SDN controller 150, one of user devices 141 or 143, and so forth). In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 400. Similarly, in one example, the steps, functions, or operations of method 400 may be performed by a processing system including one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system may maintain a graph database including graph state information for a set of elements of a graph, wherein the graph state information includes, for each of the elements in the set of elements of the graph, respective element state information for the respective element.

At step 420, the processing system may generate, from the graph database, an historical graph database including historical graph state information, wherein the historical graph state information includes, for each of the elements in the set of elements of the graph, the respective element state information for the respective element and respective state version tracking information for the respective element. The generating may include copying, for each of the elements in the set of element of the graph, the respective element state information for the respective element from the graph database to the historical graph database and associating, for each of the elements in the set of elements of the graph, the respective state version tracking information for the respective element with the respective element state information for the respective element. The associating may include determining, for at least one of the elements in the set of elements of the graph, the respective state version tracking information for the respective at least one of the elements. The determining of the respective state version tracking information for the respective at least one of the elements may include generating the respective state version tracking information for the respective at least one of the elements (e.g., fabricating the respective state version tracking information for the respective at least one of the elements). The determining of the respective state version tracking information for the respective at least one of the elements may include obtaining, for the respective at least one of the elements, actual state version tracking information for the respective at least one of the elements and using the actual state version tracking information for the respective at least one of the elements as the respective state version tracking information for the respective at least one of the elements based on a determination that the actual state version tracking information for the respective at least one of the elements has been verified.

At optional step 430, the processing system may obtain an event indicative of a management action performed for the graph and update, based on the event indicative of the management action performed for the graph, the historical graph state information of the historical graph database. In one example, updating the historical graph state information of the historical graph database includes providing state version tracking information associated with the event indicative of the management action performed for the graph. In an example in which the management action includes a create action for a new element for the graph, updating the historical graph state information of the historical graph database may include providing new element state information for the new element for the graph and providing new state version tracking information for the new element state information, wherein the new state version tracking information includes at least one of a starting timestamp or a starting source of truth. In an example in which the management action includes an update action for an existing element of the graph, updating the historical graph state information of the historical graph database may include updating existing element state information for the existing element of the graph and providing updated state version tracking information for the existing element state information, where the updated state version tracking information includes at least one of a starting timestamp or a starting source of truth. In an example in which the management action includes a delete action for an existing element of the graph, updating the historical graph state information of the historical graph database may include providing updated state version tracking information for existing element state information for the existing element of the graph, wherein the updated state version tracking information includes at least one of an ending timestamp or an ending source of truth.

At optional step 440, the processing system may obtain a query for a set of information of the historical graph database and provide, using the historical graph database, a query response including the set of information of the historical graph database.

At optional step 450, the processing system may perform an historical state information control process. The historical state information control process may include a truncating process configured to remove at least a portion of the historical graph state information from the historical state database based on a truncation time. In one example, the truncating process may be configured to delete, from the historical graph database for each element of the graph having respective state version tracking information including a respective ending timestamp prior to the truncation time, the respective historical element state information for the respective element of the graph. The historical state information control process may include an archiving process configured to create one or more archival partitions of the historical state database. In one example, the archiving process is configured to create, from the historical graph database for an archival time period, an archival partition including a portion of the historical graph state information of the historical graph database associated with the archival time period. In one example, the archiving process is configured to create, from the historical graph database for a plurality of archival time periods, a respective plurality of archival partitions including respective portions of the historical graph state information of the historical graph database associated with the respective archival time periods.

Following step 450, the method 400 proceeds to step 495 where the method 400 ends.

It will be appreciated that any or all of optional steps 430, 440, or 450 may be performed (or omitted), may be performed in any order, may be performed any number of times, and so forth. For instance, in one example the processing system may repeat optional step 430 to continue to update the historical graph database based on the event stream. In one example, the processing system may repeat optional step 440 to continue to answer queries based on the historical graph database. For instance, in one example the processing system may repeat optional step 450 to continue to support management of the historical graph state information of the historical graph database (e.g., based on one or more of truncation, archiving, and so forth). It will be appreciated that these and other modifications are all contemplated within the scope of the present disclosure.

It should also be noted that the method 400 may be expanded to include additional steps, or may be modified to replace steps with different steps, to combine steps, to omit steps, to perform steps in a different order, and so forth. It will be appreciated that these and other modifications are all contemplated within the scope of the present disclosure.

In addition, although not expressly specified above, one or more steps of the method 400 may include a storing, displaying, and/or outputting steps as required for a particular application. In other words, any data, records, fields, and/or intermediate results discussed in the method can be stored, displayed, and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative example and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

It is noted that various examples presented herein may provide various advantages, such as supporting performance increases on historical queries and storage requirement management, supporting the ability to build historical views of existing topologies and network elements, supporting the ability to obtain a historical state of a topology query and network element historical states, supporting the ability to build full historical states of a topological network view at varying points in time while providing data retention and archiving capabilities configured to help with performance and storage requirements, supporting retention of data such that a reliable epoch of historical states (e.g., elements/topologies) are obtainable in the system (e.g., not having incomplete states at given timestamps), supporting use of versioning of state information of graph elements (e.g., vertices and edges and their associated properties, such as attributes, relationships, and so forth) to provide a time series graph database which may be used for various management proposes, providing extraction, transformation, and loading processes that enable loading of relational data for time series graph databases and purging or archiving of relational data for time series graph databases (e.g., an Extract, Transform, and Load (ETL) process to serve time series graph data with initial loading of versioning in vertices and edges and algorithms to purge old versions for a time series graph database with any schema to enable data retention and data archiving), and so forth.

It is noted that various examples presented herein for supporting graph databases including versioning information may provide various advantages, such as providing network troubleshooting support for various stakeholders (e.g., operations support, tier support, systems engineers, and so forth), providing various metrics surrounding the lifecycle times of network elements/topologies (e.g., how long does it take to build out a generic-VNF on average), identifying corrective measures for discrepancies in network topology, providing more in-depth understanding of issues (e.g., the who, what, and when), enable the establishment of preventive measures including automated analytics, supporting reconstruction of portions of inventory and topology in case of a failure, supporting tracking and resolution of data integrity/quality issues, and so forth.

It is noted that various examples presented herein for supporting graph databases including versioning information may support an ability to track historical states of any set of interconnected data modeled in a graph database. It will be appreciated that, although primarily presented herein with respect to examples in which graph databases including versioning information are used to support the ability to create historic states of network elements and network topology, various examples presented herein could be used in any set of interconnected data that is loaded from an existing system and modeled in a graph database. It is noted that various examples presented herein for supporting graph databases including versioning information may support baselining the initial state of elements (e.g., vertices, links, attributes, relationships, and so forth), reliable querying of historical states, management of data truncation and archival of history while preserving the ability to reliably build historic states, and so forth. It is noted that various examples presented herein for supporting graph databases including versioning information may support modeling of various interconnected sets of objects having large quantities of associated information.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

Figure 5:
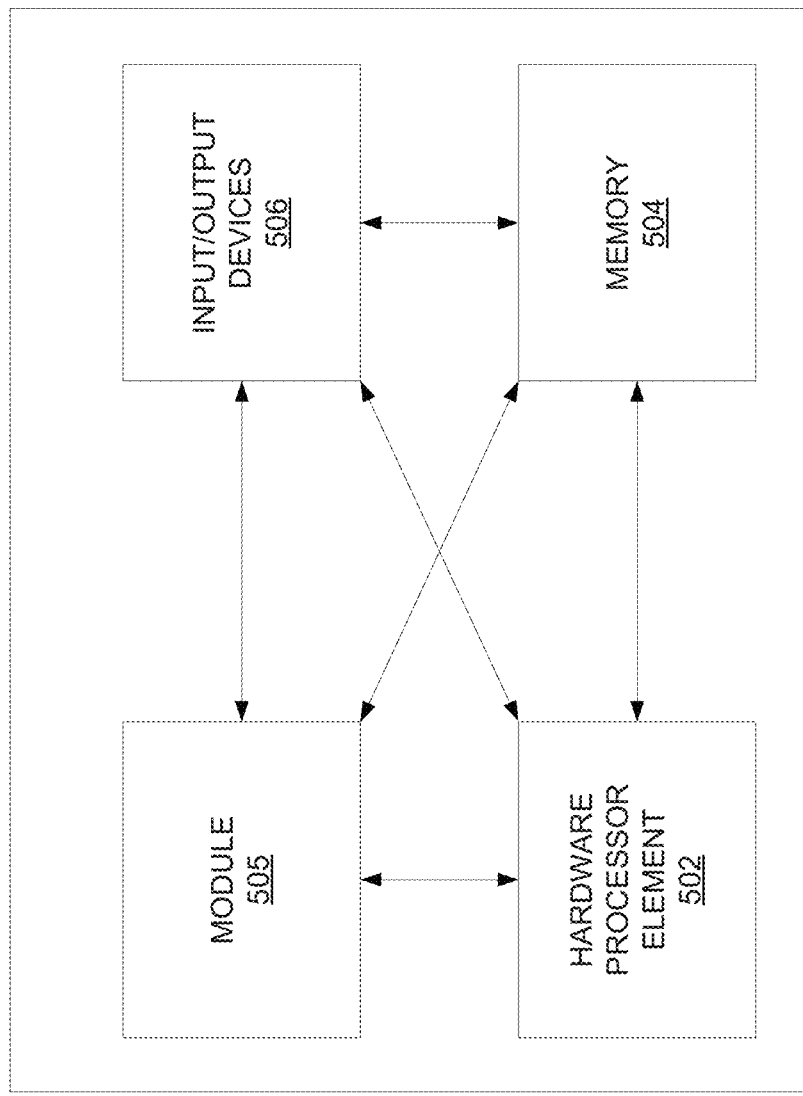
FIG. 5 illustrates a high level block diagram of a computing system specifically programmed to perform the steps, functions, blocks and/or operations described herein.

FIG. 5 depicts a high-level block diagram of a computing system 500 (e.g., a computing device or processing system) specifically programmed to perform the functions described herein. For example, any one or more components or devices illustrated in FIG. 1, FIG. 2, or FIG. 3, or described in connection with the method 400 of FIG. 4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for supporting historical state management for graph databases, and one or more input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the module 505 for supporting historical state management for graph databases (e.g., a software program comprising computer-executable instructions) can be loaded into memory 504 and executed by hardware processor element 502 to implement the steps, functions or operations as discussed above in connection with the example method 400. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the module 505 for supporting historical state management for graph databases (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:

storing, by a processing system including at least one processor deployed in a telecommunication network, a graph database including graph state information for a set of elements of a graph, wherein the graph state information represents a network state of the telecommunication network, wherein each element of the set of elements is associated with one of: a respective component, a respective link, a respective path, a respective resource, or a respective service of the telecommunication network, wherein the graph state information includes, for each of the elements in the set of elements of the graph, respective element state information for the respective element;

generating, by the processing system from the graph database, a historical graph database including historical graph state information, wherein the historical graph state information includes, for each element in the set of elements of the graph, the respective element state information for the respective element and respective state version tracking information for the respective element, wherein the generating includes, for each element in the set of element of the graph:

copying the respective element state information for the element from the graph database to the historical graph database; and associating the respective state version tracking information for the element with the respective element state information for the element; and storing, by the processing system, the historical graph database.

2. The method of claim 1, wherein, for at least one element in the set of elements of the graph, the associating includes:

determining, for the at least one element, the respective state version tracking information for the at least one element.

3. The method of claim 2, wherein the determining the respective state version tracking information for the at least one element includes:

generating the respective state version tracking information for the at least one element.

4. The method of claim 2, wherein the determining the respective state version tracking information for the at least one element includes:

obtaining, for the at least one element, actual state version tracking information for the at least one element; and using the actual state version tracking information for the at least one element as the respective state version tracking information for the at least one element.

5. The method of claim 4, wherein the actual state version tracking information for the at least one element is used as the respective state version tracking information for the at least one element based on a determination that the actual state version tracking information for the at least one element has been verified.

6. The method of claim 1, wherein, for at least one element in the set of elements of the graph, the respective state version tracking information for the at least one element includes:
  timestamp information associated with the respective element state information for the at least one element; and
  source of truth information associated with the respective element state information for the at least one element.

7. The method of claim 6, wherein the timestamp information includes a starting timestamp and an ending timestamp, wherein the source of truth information includes a starting source of truth and an ending source of truth.

8. The method of claim 1, further comprising:
  obtaining, by the processing system, an event indicative of a management action performed for the graph; and
  updating, by the processing system based on the event indicative of the management action performed for the graph, the historical graph state information of the historical graph database.

9. The method of claim 8, wherein the updating the historical graph state information of the historical graph database includes:
  providing state version tracking information associated with the event indicative of the management action performed for the graph.

10. The method of claim 1, further comprising:
  obtaining, by the processing system, a query for a set of information of the historical graph database; and
  providing, by the processing system using the historical graph database, a query response including the set of information of the historical graph database.

11. The method of claim 1, further comprising:
  performing, by the processing system an historical state information control process.

12. The method of claim 11, wherein the historical state information control process includes a truncating process configured to remove at least a portion of the historical graph state information from the historical state database based on a truncation time.

13. The method of claim 12, wherein the truncating process is configured to delete, from the historical graph database for each element of the set of elements of the graph having respective state version tracking information including a respective ending timestamp prior to the truncation time, the respective historical element state information for the respective element.

14. The method of claim 11, wherein the historical state information control process includes an archiving process configured to create one or more archival partitions of the historical state database.

15. The method of claim 14, wherein the archiving process is configured to create, from the historical graph database for an archival time period, an archival partition including a portion of the historical graph state information of the historical graph database associated with the archival time period.

16. The method of claim 14, wherein the archiving process is configured to create, from the historical graph database for a plurality of archival time periods, a respective plurality of archival partitions including respective portions of the historical graph state information of the historical graph database associated with the respective archival time periods.

17. The method of claim 16, further comprising:
  obtaining, by the processing system, a query requesting a set of information of the historical graph database for a particular time;
  obtaining, by the processing system based on the query and the plurality of archival partitions, the set of information of the historical graph database for the particular time; and
  providing, by the processing system, a query response including the set of information of the historical graph database for the particular time.

18. The method of claim 17, wherein the obtaining the set of information of the historical graph database for the particular time includes:
  determining, by the processing system from the query, the particular time for which the set of information of the historical graph database is requested;
  identifying, by the processing system based on the particular time for which the set of information of the historical graph database is requested, one of the plurality of archival partitions including the set of information of the historical graph database for the particular time; and
  obtaining, by the processing system from the one of the plurality of archival partitions including the set of information of the historical graph database for the particular time, the set of information of the historical graph database for the particular time.

19. An apparatus comprising:
  a processing system including at least one processor; and
  a computer-readable medium storing instructions which, when executed by the processing system when deployed in a telecommunication network, cause the processing system to perform operations, the operations comprising:
    storing a graph database including graph state information for a set of elements of a graph, wherein the graph state information represents a network state of the telecommunication network, wherein each element of the set of elements is associated with one of: a respective component, a respective link, a respective path, a respective resource, or a respective service of the telecommunication network, wherein the graph state information includes, for each of the elements in the set of elements of the graph, respective element state information for the respective element;
    generating, from the graph database, a historical graph database including historical graph state information, wherein the historical graph state information includes, for each element in the set of elements of the graph, the respective element state information for the respective element and respective state version tracking information for the respective element, wherein the generating includes, for each element in the set of element of the graph:
      copying the respective element state information for the element from the graph database to the historical graph database; and
    associating the respective state version tracking information for the element with the respective element state information for the element; and
    storing the historical graph database.

20. A non-transitory computer-readable medium storing instructions which, when executed by a processing system including at least one processor when deployed in a telecommunication network, cause the processing system to perform operations, the operations comprising:

storing a graph database including graph state information for a set of elements of a graph, wherein the graph state information represents a network state of the telecommunication network, wherein each element of the set of elements is associated with one of: a respective component, a respective link, a respective path, a respective resource, or a respective service of the telecommunication network, wherein the graph state information includes, for each of the elements in the set of elements of the graph, respective element state information for the respective element;

generating, from the graph database, a historical graph database including historical graph state information, wherein the historical graph state information includes, for each element in the set of elements of the graph, the respective element state information for the respective element and respective state version tracking information for the respective element, wherein the generating includes, for each element in the set of element of the graph:

copying the respective element state information for the element from the graph database to the historical graph database; and associating the respective state version tracking information for the element with the respective element state information for the element; and storing the historical graph database.

\* \* \* \* \*